United States Patent [19]
Yu et al.

[11] Patent Number: 6,066,696
[45] Date of Patent: *May 23, 2000

[54] OPTICAL ALIGNMENT COMPOSITION, ALIGNMENT LAYER FORMED USING THE SAME AND LCD HAVING THE ALIGNMENT LAYER

[75] Inventors: Han-sung Yu, Suwon; Seong-han Yu, Seoul, both of Rep. of Korea

[73] Assignee: Samsung Display Devices Co. Ltd., Kyungki-do, Rep. of Korea

[ * ] Notice: This patent is subject to a terminal disclaimer.

[21] Appl. No.: 08/987,769

[22] Filed: Dec. 9, 1997

[30] Foreign Application Priority Data

Dec. 13, 1996 [KR] Rep. of Korea ...................... 96-65516
Dec. 30, 1996 [KR] Rep. of Korea ...................... 96-76958

[51] Int. Cl.$^7$ ........................... C08G 73/00; C08L 77/00; G02F 1/13; G02F 1/1337
[52] U.S. Cl. ......................... 525/178; 525/179; 525/422; 528/170; 528/353; 428/1; 428/473.5; 349/1; 349/123; 349/127; 349/193

[58] Field of Search .................................. 525/178, 179, 525/422; 528/353, 170; 349/1, 123, 127, 193; 428/1, 473.5

[56] References Cited

U.S. PATENT DOCUMENTS 5,145,940 9/1992 Wernet et al. .......................... 528/226
5,800,952 9/1998 Wano et al. ............................ 522/167

*Primary Examiner*—P. Hampton-Hightower
*Attorney, Agent, or Firm*—Lowe Hauptman Gopstein Gilman & Berner

[57] ABSTRACT

An optical alignment composition including a first polymer selected from a cinnamate-series polymer and a coumarin-series polymer, and a second polymer selected from polyimide having a long-chain alkyl group at its side chains and polyimide having an alkyl group at its both ends, an alignment layer formed using the same, and a liquid crystal display having the alignment layer are provided. According to the present invention, the thermal stability of the alignment layer and pretilt angle characteristic of the liquid crystal are improved.

27 Claims, 1 Drawing Sheet

6,066,696

OPTICAL ALIGNMENT COMPOSITION, ALIGNMENT LAYER FORMED USING THE SAME AND LCD HAVING THE ALIGNMENT LAYER

BACKGROUND OF THE INVENTION

1. Field of the Invention

The present invention relates to a liquid crystal display (LCD), and more particularly, to an optical alignment composition containing a first polymer selected from a cinnamate-series polymer and a coumarin-series polymer, and a second polymer selected from polyimide having a long-chain alkyl group at its side chains and polyimide having an alkyl group at its both ends, an alignment layer formed using the optical alignment composition, and a liquid crystal display having the alignment layer.

2. Description of the Related Art

In general, as shown in FIG. 1, an LCD has a pair of upper and lower substrates 2 and 2' spaced apart from each other and opposed to each other. Transparent electrode layers 3 and 3' are formed on the upper and lower substrates 2 and 2'. Insulating layers 4 and 4' and alignment layers 5 and 5' are sequentially formed on the transparent electrodes 3 and 3'. A liquid crystal layer 7 is formed in the space between the upper and lower substrates 2 and 2'. Polarizing plates 1 and 1' for polarizing entering and transmitting lights are provided to the exterior of the substrates 2 and 2', respectively.

In the LCD having the aforementioned structure, according to an externally applied voltage, the arrangement of liquid crystals influenced by the electric field is changed. According to the changed arrangement, external light introduced to the LCD is shielded or transmitted. The LCD is driven by such a property. In other words, if a voltage is applied to the transparent electrode layers 3 and 3', an electric field is formed in the liquid crystal layer 7. Thus, liquid crystals are driven in a predetermined direction. The light introduced into the liquid crystals of the LCD is shielded or transmitted according to the driving of the liquid crystals.

The functions of the LCD as a display device, i.e., light transmittance, response time, view angle or contrast, are determined by the arrangement characteristic of the liquid crystal molecules. Therefore, a technology of controlling the alignment of the liquid crystal molecules uniformly is a very important factor.

The uniform alignment state of the liquid crystals is difficult to accomplish by merely interposing the liquid crystals between the upper and lower substrates. Thus, as shown in FIG. 1, it is general to form the alignment layers 5 and 5' for aligning liquid crystals on the transparent electrode layers 3 and 3'.

The alignment layer is conventionally formed by a rubbing method in which a thin film made of an organic polymer material such as polyimide or polyamide is formed, cured and then rubbed with a special cloth.

The rubbing method is easy to conduct and the process thereof is simple. However, minute particles or materials such as cellulose may separate from the cloth used in the rubbing treatment to contaminate the alignment layer. Further, depending on the material for forming the alignment layer, the alignment may not be accomplished smoothly. A thin film transistor may be damaged by static electricity generated during the rubbing treatment.

To solve the above-described problems, an optical alignment technology has been developed in which dust, static electricity or other pollutant particles are not generated and cleanliness is maintained during the overall process. According to such a non-destructive alignment method, polarized light is irradiated onto the optical alignment layer to cause anisotropic photopolymerization. As a result, the optical alignment layer has alignment characteristic, thereby uniformly aligning the liquid crystals. The polymer for the optical alignment layer includes polyvinylcinnamate (PVCN) and polyvinylmethoxyxinnamate (PVMC). However, such polymers have poor thermal stability, although they have an excellent optical alignment property. In other words, the thermal stability of an alignment layer depends upon that of the polymer, which depends upon a glass transition point and cross linking density. Since the PVCN or PVMC has a relatively glass transition point of 100° C. or below, so that post-alignment thermal stability is decreased. Further, it is difficult to form a pretilt angle due to a symmetry structure obtained after cross-linking reaction.

SUMMARY OF THE INVENTION

To solve the above problem(s), it is an object of the present invention to provide an optical alignment composition having excellent thermal stability and an excellent pretilt angle characteristic.

It is another object of the present invention to provide an alignment layer formed using the optical alignment composition.

It is still another object of the present invention to provide a liquid crystal display (LCD) having the alignment layer.

Accordingly, to achieve the first object, there is provided an optical alignment composition including a first polymer selected from a vinylcinnamate-series polymer and a coumarin-series polymer and a second polymer selected from polyimide having an alkyl (R) group at its both ends and polyimide represented by the following formula (1):

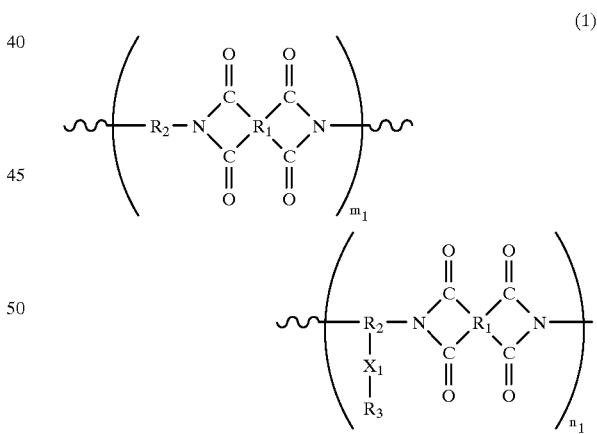

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B [Here, A and B are each independently selected from the group consisting of an unsubstituted aromatic ring and an aromatic ring (Here, the aromatic ring is a monocyclic ring of six carbon atoms, a bicyclic ring of ten carbon atoms or a tricyclic ring of fourteen carbon atoms.), and Y is —O—, carbonyl(C=O) or —C($R_4$) ($R_5$)— (Here, $R_4$ and $R_5$ are each independently selected from the group consisting of hydrogen, $C_1$–$C_{10}$ alkyl, and $C_1$–$C_{10}$ alkyl having at least one substituent (G))]; $R_2$ is selected from the group consisting of an unsubstituted aromatic ring, aromatic ring having at least one substituent (G) (Here, the aromatic ring is a monocyclic ring of six carbon atoms, a bicyclic ring of ten carbon atoms or a tricyclic ring of fourteen carbon atoms.), a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B (Here, A, B and Y are as defined as above); $X_1$ represents —COO—, —O— or —OCO—; and $R_3$ is a $C_3$–$C_{10}$ alkyl (Here, the substituent (G) is selected from the group consisting of $C_1$–$C_{10}$ alkyl, an aromatic, unsubstituted or substituted amino, a halide, hydroxy (OH), nitro ($NO_2$), cyano (CN), thiocyano (SCN), tiol (SH) and carboxyl (COOH)); and $m_1$:$n_2$ is 1:99 to 20:80 and $m_1$ is a positive integer including zero.

The polyimide having an alkyl at its both ends is selected from compounds represented by the formula (2):

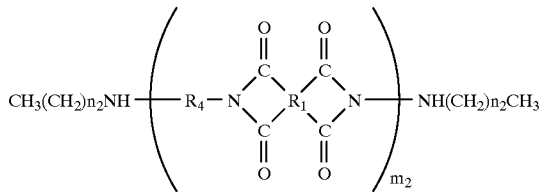
(2)

where $R_1$ is as defined above, $R_4$ is selected from the group consisting of an unsubstituted aromatic ring, aromatic ring having at least one substituent (G) (Here, the aromatic ring is a monocyclic ring of six carbon atoms, a bicyclic ring of ten carbon atoms or a tricyclic ring of fourteen carbon atoms.), a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B (Here, A, B and Y are as defined above), (Here, the substituent (G) is selected from the group consisting of a $C_1$–$C_{10}$ alkyl, an aromatic, unsubstituted or substituted amino, a halide, a hydroxy (OH), a nitro ($NO_2$), cyano (CN), thiocyano (SCN), tiol (SH) and carboxyl (COOH)) groups, $m_2$ is an integer from 10 to 100 and $m_2$ $n_2$ is an integer from 2 to 9.

The second object of the present invention is achieved by an alignment layer including a first polymer selected from a cinnamate-series polymer and a coumarin-series polymer, and a second polymer selected from polyimide having an alkyl (R) group at its both ends and polyimide represented by the formula (1).

The third object of the present invention is achieved by an LCD having the alignment layer including a first polymer selected from a cinnamate-series polymer and a coumarin-series polymer, and a second polymer selected from polyimide having an alkyl (R) group at its both ends and polyimide represented by the formula (1).

BRIEF DESCRIPTION OF THE DRAWING(S)

The above objects and advantages of the present invention will become more apparent by describing in detail a preferred embodiment thereof with reference to the attached drawing in which:

FIG. 1 is a section view of a general liquid crystal display.

DESCRIPTION OF THE PREFERRED EMBODIMENT(S)

Figure 1:
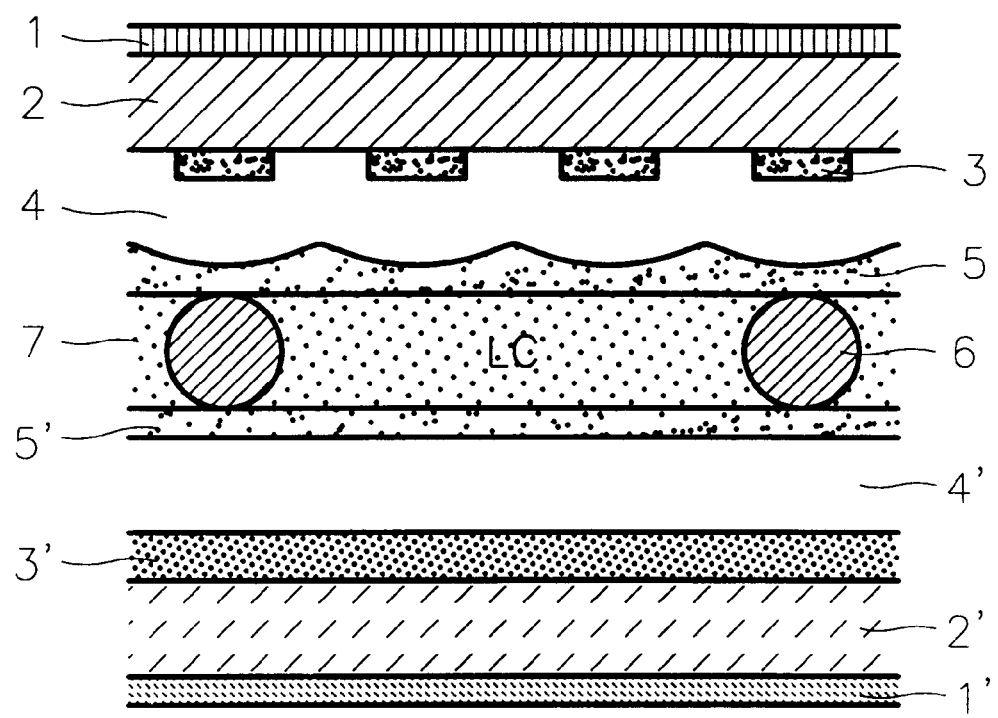

In the polyimide of the formula (1), $R_1$ is preferably selected from the group consisting of:

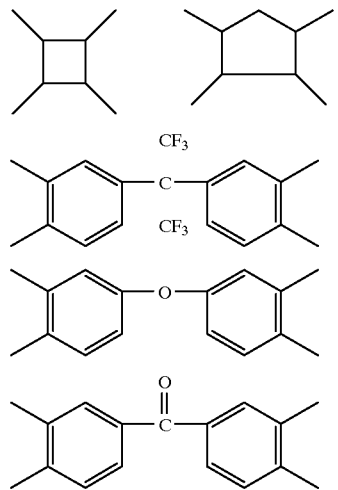

and $R_2$ is preferably selected from the group consisting of:

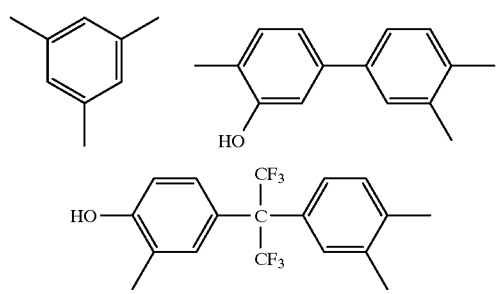

(Here, $R_3$ is a $C_3$–$C_{20}$ alkyl, and is preferably a long chain alkyl of $C_8$–$C_{12}$, which is advantageous in forming a desired pretilt angle.).

In the polyimide of the formula (2), $R_1$ is as defined above, $R_4$ is selected from the group consisting of:

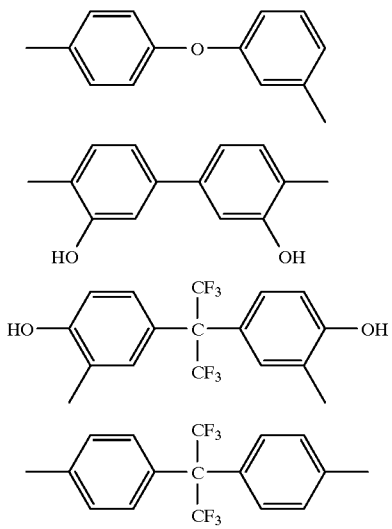

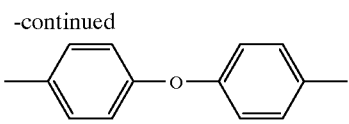

and $n_2$ is an integer from 2 to 9.

The present invention is characterized in using an optical alignment composition produced by mixing a heat-resistant polyimide having an alkyl group at its end or side chain with a conventional cinnamate-series polymer or coumarin-series polymer, thereby improving thermal stability of alignment and enhancing a pretilt angle by the interaction between the introduced alkyl group and liquid crystals.

In the present invention, it is preferable that the weight ratio of a first polymer selected from a cinnamate-series polymer and a coumarin-series polymer to a second polymer selected from polyimide having an alkyl (R) group at its both ends and polyimide of the formula (1) is between 99:1 and 80:20, which is because the optical alignment and thermal stability are superior within this range.

The weight average molecular weight of the polyimide represented by the formulas (1) and (2) is $5 \times 10^3$ to $5 \times 10^5$.

The cinnamate series polymer is preferably selected from polyvinylcinnamate, polyvinylmethoxycinnamate and polyimide having a cinnamate group at its side chain and the weight-average molecular weight thereof is preferably between $5 \times 10^3$ and $5 \times 10^5$.

The coumarin-series polymer is preferably selected from polymers represented by the formulas 3 through 5 and having a coumarin moity at its side chain, and the weight-average molecular weight thereof is preferably between $5 \times 10^3$ and $5 \times 10^5$.

(3)

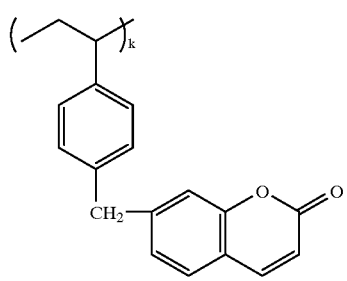

(4)

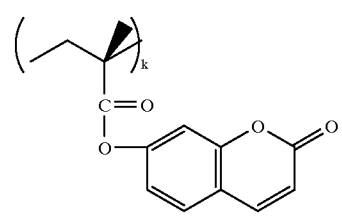

(5)

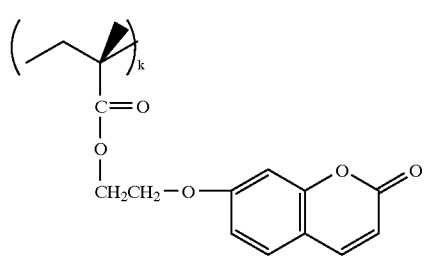

where k is an integer from 20 to 2000.

Hereinbelow, methods of manufacturing an optical alignment composition, an alignment layer using the same and an LCD having the alignment layer according to the present invention will be described.

First, the method of producing polyimide of the formula (1) will be explained.

Acid anhydride (A) and a diamine compound (B) are reacted to synthesize a polyamic acid (C). Then, the polyamic acid (C) is imidized to synthesize a polyimide (D).

[Reaction scheme (1)]

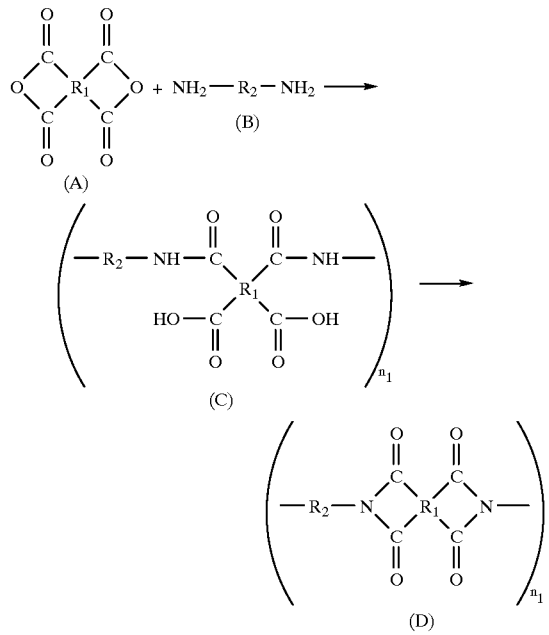

The polyimide (D) and alkyl halide (E) are reacted to synthesize polyimide (F) having an alkyl group at its side chain. At this time, if excess alkyl halide is used, polyimide having 100% substitution rate in alkyl group, i.e., the polyimide where $m_1$ is zero in the formula (1), can be synthesized.

[Reaction scheme (2)]

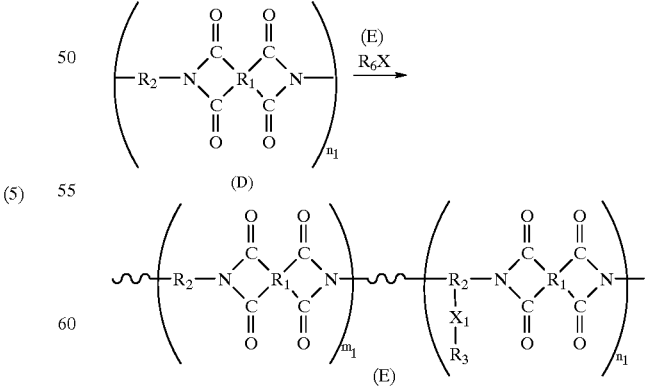

where X is selected from the group consisting of chloride (Cl), bromide (Br) and iodide (I), and $R_6$ is selected from the group consisting of

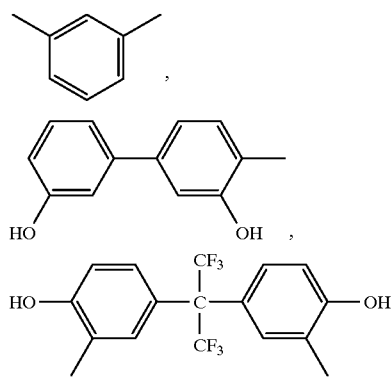

Soluble polyimide having an alkyl group at its polymer end is synthesized in the following manner.

Acid anhydride (A), a diamine compound (B) and solvent are mixed and 1 to 10 mole % of alkyl amine, based on the weight of the acid anhydride, is added to the mixture. The resultant is reacted to synthesize a polyamic acid (C') in a temperature of 0° to 25° C. Then, the polyamic acid (C') is imidized to synthesize soluble polyimide (G).

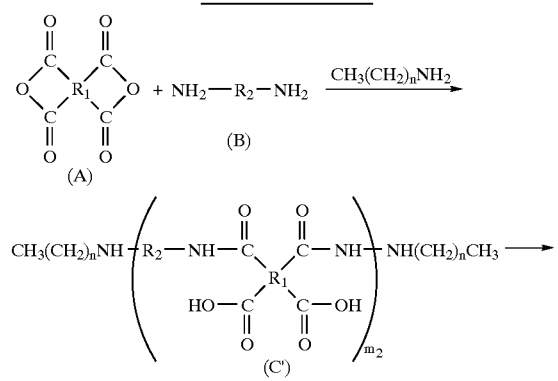

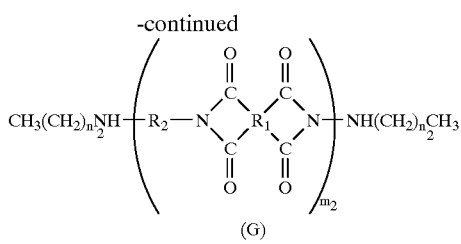

A polymer selected from polyimide (F) and polyimide (G) produced in the above-described manner and a polymer selected from a cinnamate-series polymer and a coumarin-series polymer are mixed in a weight ratio of between 1:99 and 20:80 and mixed with an appropriate solvent to form an optical alignment composition. At this time, as the solvent, N-methyl-2-pyrrolidone (NMP), dimethylformamide (DMA) or methylcellosolve was used.

The compositions is coated on two glass substrates, and then the solvent was dried to form an alignment layer. Subsequently, linear polarized light (wavelength: 300~400 nm) is irradiated to conduct a photo-reaction. Then, two substrates are sealed with a predetermined gap maintained using a spacer, thereby forming an empty cell.

Thereafter, liquid crystals are injected into the empty cell to complete an LCD.

Hereinbelow, the present invention will be described with reference to various embodiments, but the invention is not limited thereto.

EXAMPLE 1

3,3'4,4'-benzophenonetetracarboxylic dianhydride (H) and 3,5-diaminobenzoic acid (I) were reacted to synthesize a compound (J), and then the compound (J) was dehydrated to obtain a compound (K).

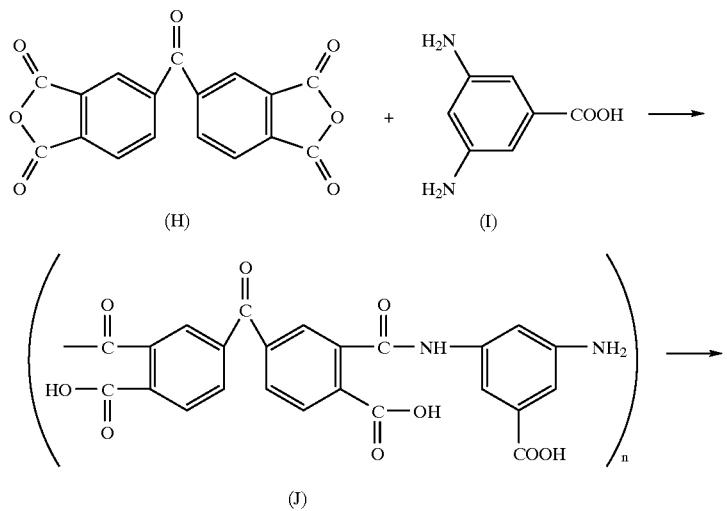

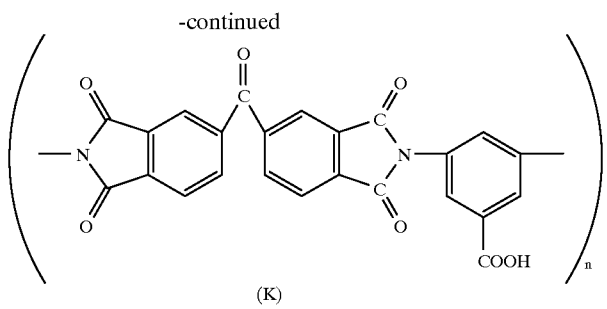

(K)

The compound (K) was reacted with propyl bromide and pyridine to obtain polyimide (L).

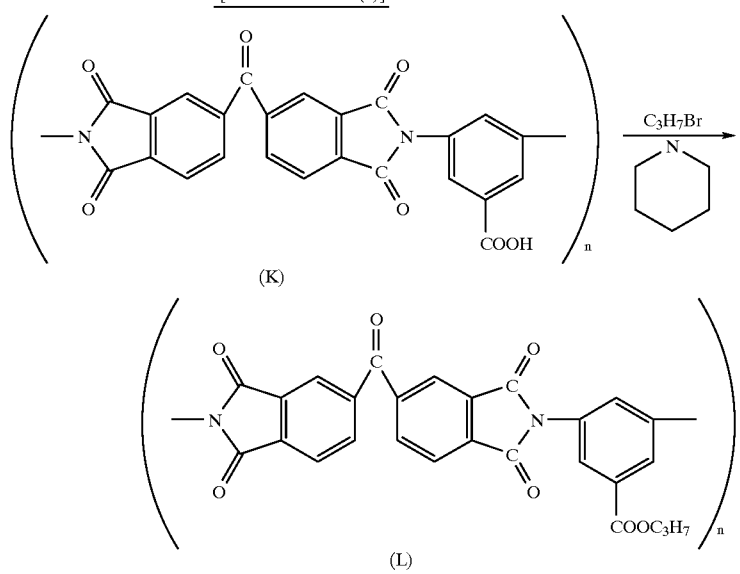

0.02 g of the polyimide (L) and 0.18 g of polyvinylcinnamate were dissolved in 10 g of NMP. Then, the resultant was spin-coated on two glass substrates and were dried at about 100° C. for 1 hour to form an alignment layer.

Then, linear polarized light (wavelength: about 300–400 nm) was irradiated into the alignment layer using a high pressure mercury lamp having light intensity of about 10 mw/cm$^2$ to conduct a photo-reaction for about 5 minutes.

An empty cell was manufactured by sealing two glass substrates where the alignment layer was formed. An LCD was completed by injecting liquid crystals into the empty cell.

EXAMPLE 2

With the exception of octyl bromide being used instead of propyl bromide, the same process was carried out as described in Example 1.

EXAMPLE 3

With the exception of dodecyl bromide being used instead of propyl bromide, the same process was carried out as described in Example 1.

EXAMPLE 4

3.22 g of 3,3'4,4'-benzophenonetetracarboxylic dianydride and 1.80 g of 4,4'-diaminodiphenyl ether were mixed in NMP, and then 0.28 g of undecyl amine(CH$_3$(CH$_2$)$_{10}$NH$_2$) was added slowly to synthesize a polyamic acid through a series of reactions. Subsequently, the polyamic acid was dehydrated to obtain a polyimide.

THEN, 0.02 g of the polyimide was mixed with 0.18 g of polyvinylcinnamate (Aldrichi Chemical Company Inc.) and 10 g of NMP to form an alignment composition, which was then adjusted to have an appropriate viscosity, and then spin-coated on two glass substrates where an ITO electrode layer is coated, respectively. Subsequently, the resultant was dried at about 100° C. for 1 hour to form an alignment layer.

Then, linear polarized light of about 300–400 nm wavelength was irradiated into the alignment layer to conduct a photo-reaction for about 5 minutes. An empty cell was manufactured by sealing the obtained two glass substrates while maintaining the gap of a predetermined width between two glass substrates using a spacer. An LCD was completed by injecting liquid crystals into the empty cell.

EXAMPLE 5

With the exception of 0.04 g of polyimide manufactured in Example 1 and 0.16 g of polyvinylcinnamate being used, an LCD was fabricated in the same manner as described in Example 1.

COMPARATIVE EXAMPLE

With the exception of 0.2 g of polyvinylcinnamate (Aldrichi Chemical Company Inc.) and 10 g of NMP as the optical alignment composition being used, an LCD was fabricated in the same manner as described in Example 1.

In the LCD manufactured in Examples 1–5 and Comparative Example, the pretilt angle of the liquid crystal and thermal stability of the alignment layer were measured. Here, the pretilt angle was measured using a crystal rotation method, and the thermal stability was measured by raising the temperature up to 180° C., maintaining the resultant as it is for a predetermined time at that temperature, lowering the temperature to room temperature, and then checking the state of the alignment layer depending on the change in temperatures through a polarizing film.

As the result of the measurement, in the LCD manufactured according to Example 1–5, considering from the fact that the alignment state of the alignment layer was not changed even when the temperature was increased up to 180° C., it was appreciated that the thermal stability was very excellent.

Also, the pretilt angle of the liquid crystal was increased to 15°. Specifically, as in the cases of the examples 2 and 3 where a polymer having a long-chain alkyl group was used, the pretilt angle was more remarkably improved.

However, in the case of the LCD manufactured according to Comparative Example, the alignment property was excellent but the thermal stability was poor, that is, the alignment layer was deformed from about 70° C. and the pretilt angle was about 0°.

According to the present invention, the thermal stability of the alignment layer and pretilt angle characteristic of liquid crystal are improved.

What is claimed is:

1. An optical alignment composition comprising a first polymer selected from a cinnamate polymer and a coumarin polymer, and a second polymer selected from a polyimide, having an alkyl (R) group at both its, ends, and a polyimide represented by the formula (1):

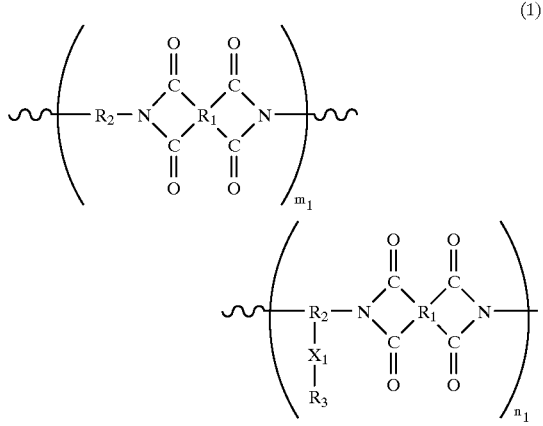

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B, where A and B are each independently selected from the group consisting of a substituted or unsubstituted aromatic ring selected from the group consisting of a monocyclic ring of six carbon atoms, a bicyclic ring of ten carbon atoms and a tricyclic ring of fourteen carbon atoms, and Y is —O—, carbonyl (C=O) or —C($R_4$)($R_5$)—, where $R_4$ and $R_5$ are each independently selected from the group consisting of hydrogen, $C_1$–$C_{10}$ alkyl, and $C_1$–$C_{10}$ alkyl having at least one substituent (G);

$R_2$ is selected from the group consisting of an unsubstituted aromatic ring, an aromatic ring having at least one substituent (G), where the aromatic ring is selected from the group consisting of a monocyclic ring of six carbon atoms, a bicyclic ring of ten carbon atoms and a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B, where A, B and Y are as defined as above;

$X_1$ represents —COO—, —O— or —OCO—; and $R_3$ is a $C_3$–$C_{10}$ alkyl, where the substituent (G) is selected from the group consisting of $C_1$–$C_{10}$ alkyl, an aromatic, unsubstituted or substituted amino, a halide, hydroxy (OH), nitro ($NO_2$), cyano (CN), thiocyano (SCN), thiol (SH) and carboxyl (COOH);

$m_1:n_1$ is 1:99 to 20:80; and $m_1$ is a positive integer including zero.

2. The optical alignment composition of claim 1, wherein the polyimide having an alkyl group at both its ends is selected from compounds represented by the formula (2):

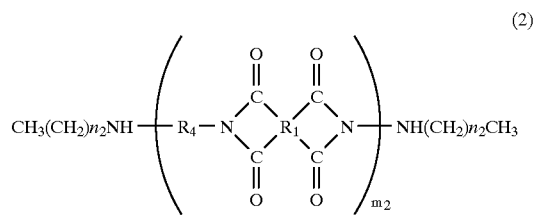

where $R_4$ is selected from the group consisting of a substituted or unsubstituted aromatic ring, wherein said substituted aromatic ring was at least one substituent (G), where the aromatic ring is selected from a monocyclic ring of six carbon atoms, a bicyclic ring of ten carbon atoms and a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkyenyl, a $C_3$–$C_{10}$ cycloalkyenyl having at least one substituent (G), and a compound having the formula A—Y—B, where the substituent (G) is selected from the group consisting of a $C_1$–$C_{10}$ alkyl, an aromatic, unsubstituted or substituted amino, a halide, a hydroxy (OH), a nitro ($NO_2$), cyano (CN), thiocyano (SCN), tiol (SH) and carboxyl (COOH)) groups, $m_2$ is an integer from 10 to 100 and $n_2$ is an integer from 2 to 9.

3. The optical alignment composition of claim 1, wherein, in the formula (1), $R_1$ is selected from the group consisting of:

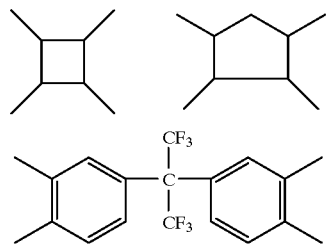

-continued

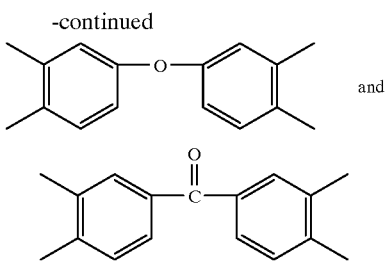
and $R_2$ is selected from the group consisting of:

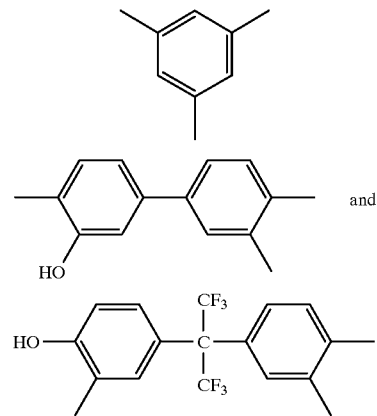

where $R_3$ is a $C_3$–$C_{20}$ alkyl.

4. The optical alignment composition of claim 1, wherein, in the formula 2, $R_4$ is selected from the group consisting of:

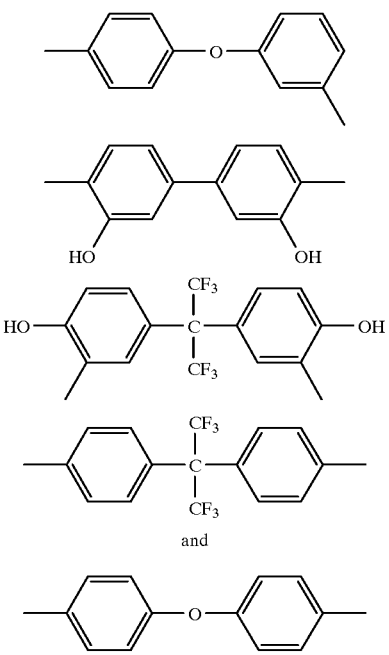

and $n_2$ is a number from 2 to 19.

5. The optical alignment composition of claim 1, wherein the weight ratio of the first polymer to the second polymer is about 99:1 to 80:20.

6. The optical alignment composition of claim 1, wherein the cinnamate polymer is selected from the group consisting of polyvinylcinnamate, polyvinylmethoxycinnamate and a polyimide having a cinnamate group as a side chain.

7. The optical alignment composition of claim 1, wherein the coumarin polymer is selected from polymers represented by the formulas 3 through 5 and having a coumarin component as a side chain:

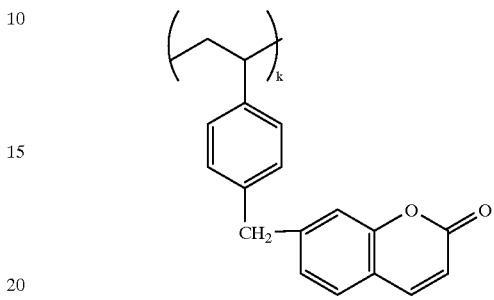
(3)

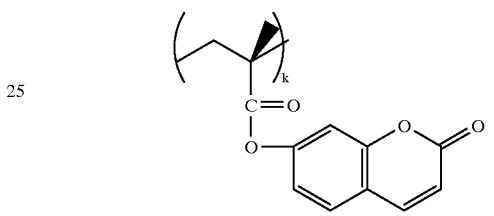
(4)

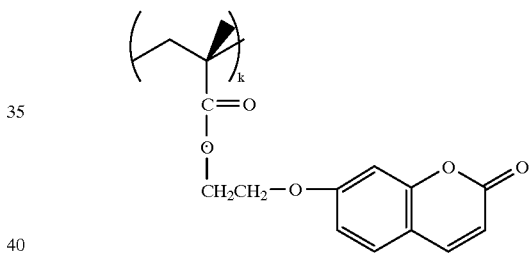
(5)

wherein K is an integer from 20 to 2000.

8. The optical alignment composition of claim 1, wherein the weight-average molecular weight of the second polymer is about $5 \times 10^3$ to $5 \times 10^5$.

9. The optical alignment composition of claim 1, wherein the weight-average molecular weight of the cinnamate-polymer or coumarin- polymer is about $5 \times 10^3$ to $5 \times 10^5$.

10. An optical alignment layer comprising a first polymer selected from a cinnamate polymer and a coumarin polymer, and a second polymer selected from a polyimide having an alkyl (R) group at both its ends and a polyimide represented by the formula (1):

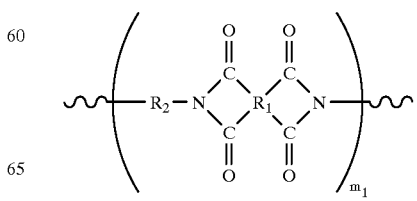
(1)

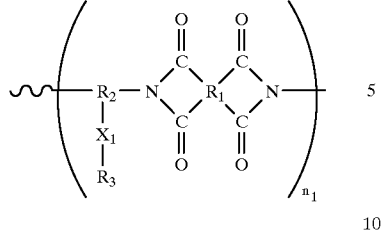

where R₁ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B, where A and B are each independently selected from the group consisting of a substituted or unsubstituted aromatic ring where the aromatic ring is a monocyclic ring of six carbon atoms, a bicyclic ring of ten carbon atoms or tricyclic ring of fourteen carbon atoms, and Y is —O—, carbonyl (C=O) or —C(R₄)(R₅)—, where; and R₂ is selected from the group consisting of an unsubstituted aromatic ring, an aromatic ring having at least one substituent (G), where the aromatic ring is a monocyclic ring of six carbon atoms, a bicyclic ring of ten carbon atoms or a tricyclic ring of fourteen carbon atoms, a $C_3$–$C_{10}$ cycloalkyl, a $C_3$–$C_{10}$ cycloalkyl having at least one substituent (G), and $C_3$–$C_{10}$ cycloalkenyl, a $C_3$–$C_{10}$ cycloalkenyl having at least one substituent (G), and a compound having the formula A—Y—B; X₁ represents —COO—, —O— or —OCO—;

R₃ is a $C_3$–$C_{10}$ alkyl, where the substituent (G) is selected from the group consisting of $C_1$–$C_{10}$ alkyl, an aromatic, unsubstituted or substituted amino, a halide, hydroxy (OH), nitro (NO₂), cyano (CN), thiocyano (SCN), thiol (SH) and carboxyl (COOH)); $m_1$:$n_1$ is 1:99 to 20:80; and $m_1$ is a positive integer including zero.

11. The optical alignment layer of claim 10, wherein the polyimide having an alkyl group at both its ends is selected from compounds represented by the formula (2):

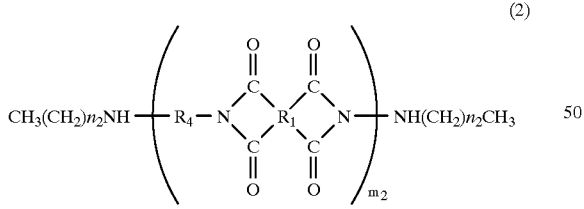

(2)

where R₄ is selected from the group consisting of an unsubstituted aromatic ring, an aromatic ring having at least one substituent (G), where the aromatic ring is a monocyclic ring of six carbon atoms, a bicyclic ring of ten carbon atoms or a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B $m_2$ is an integer from 10 to 100 and $n_2$ is an integer from 2 to 9.

12. The optical alignment layer of claim 10, wherein, in the formula (1), R₁ is selected from the group consisting of:

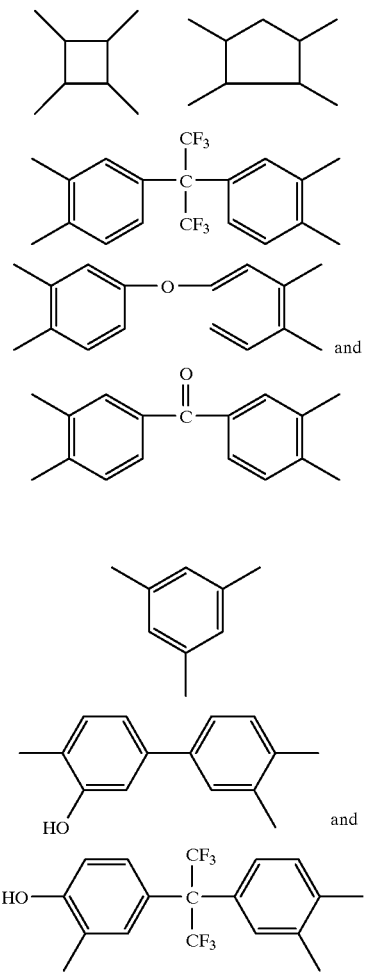

R₂ is selected from the group consisting of:

where R₃ is a $C_3$–$C_{10}$ alkyl.

13. The optical alignment layer of claim 10, wherein, in the formula s2, R₄ is selected from the group consisting of:

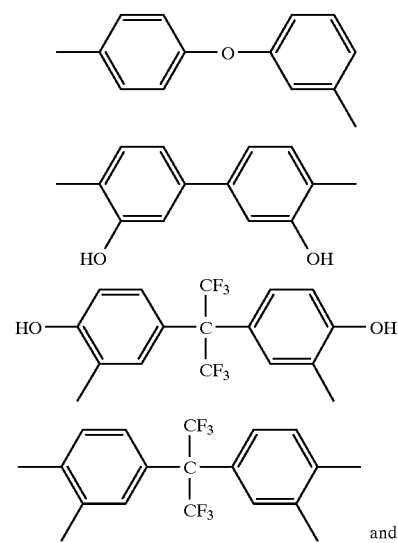

-continued

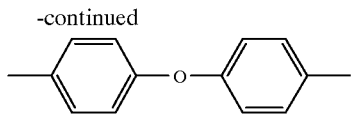

and $n_2$ is a number from 2 to 19.

14. The optical alignment layer of claim 10, wherein the weight ratio of the first polymer to the second polymer is about 99:1 to 80:20.

15. The optical alignment layer of claim 10, wherein the cinnamate polymer is selected from the group consisting of polyvinylcinnamate, polyvinylmethoxycinnamate and a polyimide having a cinnamate group as a side chain.

16. The optical alignment layer of claim 10, wherein the coumarin polymer is selected from polymers represented by the formulas 3 through 5 and having a coumarin component as a side chain:

(3)

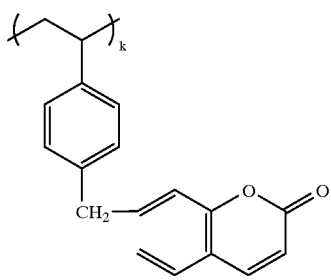

(4)

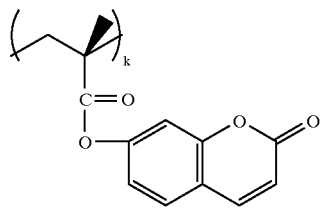

(5)

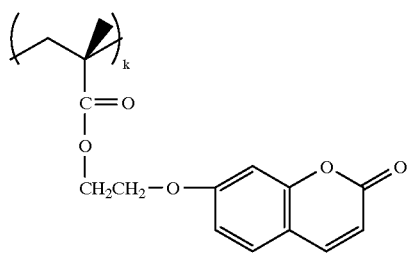

wherein k is an integer from 20 to 2000.

17. The optical alignment layer of claim 10, wherein the weight-average molecular weight of the second polymer is about $5 \times 10^3$ to $5 \times 10^5$.

18. The optical alignment layer of claim 10, wherein the weight-average molecular weight of the cinnamate polymer or coumarin-series polymer is about $5 \times 10^3$ to $5 \times 10^5$.

19. A liquid crystal display (LCD) comprising a first polymer selected from a cinnamate polymer and a coumarin polymer, and a second polymer selected from a polyimide having an alkyl ( R) group at both its ends and a polyimide represented by the formula (1):

(1)

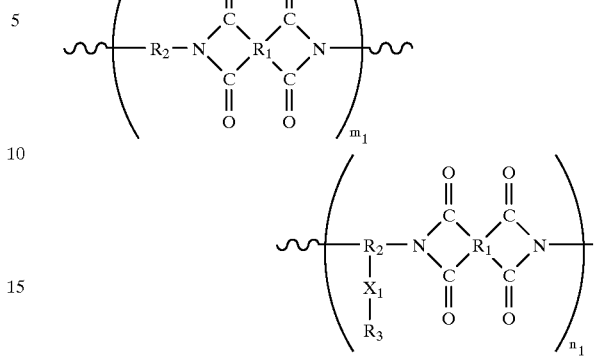

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B, where A and B are each independently selected from the group consisting of a substituted or unsubstituted aromatic ring, where the aromatic ring is a monocyclic ring of six carbon atoms, a bicyclic ring of ten carbon atoms or a tricyclic ring of fourteen carbon atoms, and Y is —O—, carbonyl (C=O) or —C($R_4$)($R_5$)—, where $R_4$ and $R_5$ are each independently selected from the group consisting of hydrogen, $C_1$–$C_{10}$ alkyl having at least one substituent (G);

$R_2$ is selected from the group consisting of an unsubstituted aromatic ring, an aromatic ring having at least one substituent (G), where the aromatic ring is a monocyclic ring of six carbon atoms, a bicyclic ring of ten carbon atoms or a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B;

$X_1$ represents —COO—, —O— or —OCO—; and $R_3$ is a $C_3$–$C_{10}$ alkyl, where the substituent (G), is selected from the group consisting of $C_1$–$C_{10}$ alkyl, an aromatic, unsubstituted or substituted amino, a halide, hydroxy (OH), nitro($NO_2$), cyano (CN), thiocyano (SCN), thiol (SH) and carboxyl (COOH)); and $m_1:n_1$ is 1:99 to 20:80 and $m_1$ is a positive integer including zero.

20. The LCD of claim 19, wherein the polyimide having an alkyl group at both its ends is selected from compounds represented by the formula (2):

(2)

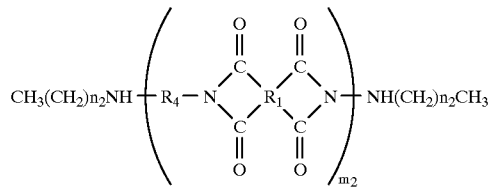

where $R_4$ is selected from the group consisting of an unsubstituted aromatic ring, an aromatic ring having at least one substituent (G), where the aromatic ring is a monocyclic ring of six carbon atoms, a bicyclic ring of then carbon atoms or a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B, $M_2$ is an integer from 10 to 100, and $n_2$ is an integer from 2 to 9.

21. The LCD of claim 19, wherein, in the formula (1), $R_1$ is selected from the group consisting of:

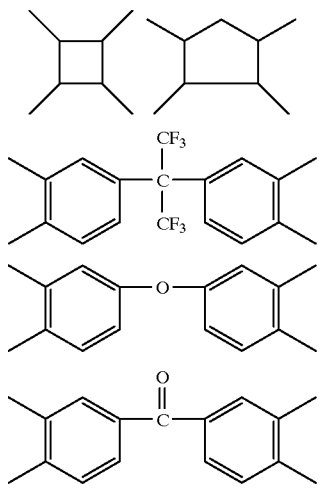

and $R_2$ is selected from the group consisting of:

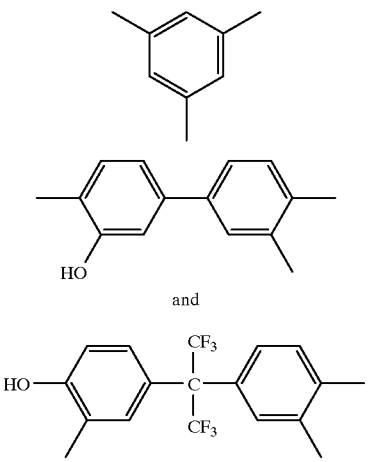

$R_3$ is a $C_3$–$C_{10\ alkyl}$.

22. The LCD of claim 19, wherein, in the formula 2, $R_4$ is selected from the group consisting of:

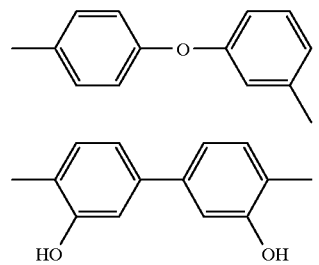

-continued

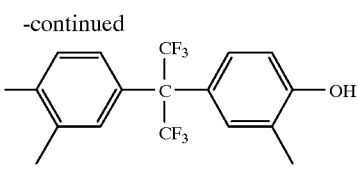

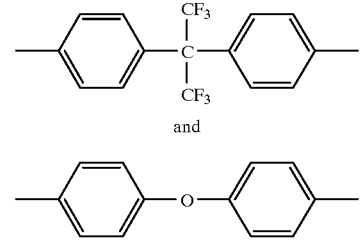

and and $n_2$ is a number from 2 to 19.

23. The LCD of claim 19, wherein the weight ratio of the first polymer to the second polymer is about 99:1 to 80:20.

24. The LCD of claim 19, wherein the cinnamate polymer is selected from the group consisting of polyvinylcinnamate, polyvinylmethoxycinnamate and polyimide having a cinnamate group as a side chain.

25. The LCD of claim 19, wherein the coumarin- polymer is selected from polymers represented by the formulas 3 through 5 and having a coumarin component as a side chain:

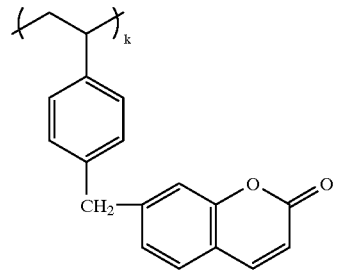

(3)

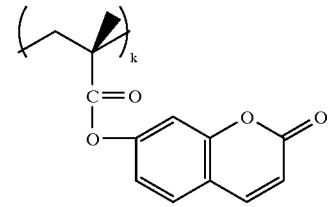

(4)

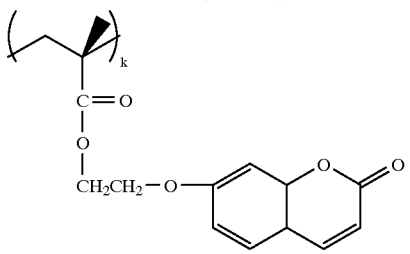

(5)

Wherein k is an integer from 20 to 2000.

26. The LCD of claim 19, wherein the weight-average molecular weight of the second polymer is about $5 \times 10^3$ to $5 \times 10^5$.

27. The LCD of claim 19, wherein the weight-average molecular weight of the cinnamate- polymer or coumarin- polymer is about $5 \times 10^3$ and $5 \times 10^5$.

* * * * *